United States Patent
Gupta et al.

(10) Patent No.: US 6,224,749 B1
(45) Date of Patent: *May 1, 2001

(54) LIQUID AND VAPOR STAGE HYDROPROCESSING USING ONCE-THROUGH HYDROGEN

(75) Inventors: Ramesh Gupta, Berkeley Heights; Henry Jung, Chatham Borough; Edward S. Ellis, Basking Ridge, all of NJ (US); Gerald E. Markley, Baton Rouge, LA (US)

(73) Assignee: Exxon Research and Engineering Company, Annandale, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/073,415

(22) Filed: May 6, 1998

(51) Int. Cl.$^7$ .................................................. C10G 65/02
(52) U.S. Cl. ............................. 208/210; 208/57; 208/58; 208/82; 208/211; 208/212; 208/218; 208/251 H; 208/254 H

(58) Field of Search ................................ 208/58, 81, 82, 208/103, 210, 211, 212, 218, 251 H, 254 H, 255, 263, 57; 422/187, 188, 190, 195

(56) References Cited

U.S. PATENT DOCUMENTS

| | | | |
|---|---|---|---|
| 2,037,789 | * | 1/1936 | Ipatieff .................................. 196/28 |
| 3,119,765 | * | 1/1964 | Corneil et al. ........................ 208/210 |
| 3,717,571 | * | 2/1973 | Schulman ............................. 208/254 |
| 3,919,402 | * | 11/1975 | Guth et al. ........................... 423/522 |
| 4,212,729 | * | 7/1980 | Hensley, Jr. et al. ................. 208/210 |
| 4,392,945 | * | 7/1983 | Howard et al. ....................... 208/210 |
| 5,720,872 | * | 2/1998 | Gupta .................................... 208/57 |
| 6,054,041 | * | 4/2000 | Ellis et al. ............................ 208/210 |

* cited by examiner

*Primary Examiner*—Walter D. Griffin
(74) *Attorney, Agent, or Firm*—Gerard J. Hughes

(57) ABSTRACT

A three stage hydroprocessing process includes two liquid and one vapor reaction stages, both of which produce an effluent comprising liquid and vapor. Both vapor effluents comprise vaporized hydrocarbonaceous material. Fresh hydrogen is used for the hydroprocessing in both liquid stages. The second stage liquid effluent comprises the product liquid. The first stage liquid effluent is the feed for the second stage. The first stage vapor effluent is hydroprocessed in the vapor stage and then cooled to condense and recover at least a portion of the processed vapor as additional product liquid.

17 Claims, 2 Drawing Sheets

LIQUID AND VAPOR STAGE HYDROPROCESSING USING ONCE-THROUGH HYDROGEN

BACKGROUND OF THE DISCLOSURE

1. Field of the Invention

The present invention relates to hydroprocessing hydrocarbonaceous feeds using two liquid and one vapor hydroprocessing reaction stages with no hydrogen transfer between the liquid stages. More particularly the invention relates to catalytically hydroprocessing a hydrocarbonaceous feed in two liquid reaction stages and one vapor reaction stage, in which both liquid stages produce an effluent comprising a liquid and a vapor which are separated after each liquid stage, with the first liquid stage vapor effluent and, optionally also the second stage vapor effluent, hydroprocessed in the vapor stage. The partially hydroprocessed first stage liquid effluent is the feed for the second stage. Fresh hydrogen is used for both liquid stage reactions.

2. Background of the Invention

As supplies of lighter and cleaner feeds dwindle, the petroleum industry will need to rely more heavily on relatively high boiling feeds derived from such materials as coal, tar sands, shale oil, and heavy crudes, all of which typically contain significantly more undesirable components, especially from an environmental point of view. These components include halides, metals, unsaturates and heteroatoms such as sulfur, nitrogen, and oxygen. Furthermore, due to environmental concerns, specifications for fuels, lubricants, and chemical products, with respect to such undesirable components, are continually becoming tighter. Consequently, such feeds and product streams require more upgrading in order to reduce the content of such undesirable components and this increases the cost of the finished products.

In a hydroprocessing process, at least a portion of the heteroatom compounds are removed, the molecular structure of the feed is changed, or both occur by reacting the feed with hydrogen in the presence of a suitable hydroprocessing catalyst. Hydroprocessing includes hydrogenation, hydrocracking, hydrotreating, hydroisomerization and hydrodewaxing, and therefore plays an important role in upgrading petroleum streams to meet more stringent quality requirements. For example, there is an increasing demand for improved heteroatom removal, aromatic saturation and boiling point reduction. In order to achieve these goals more economically, various process configurations have been developed, including the use of multiple hydroprocessing stages as is disclosed, for example, in European patent publication 0 553 920 A1 and U.S. Pat. Nos. 2,952,626; 4,021,330; 4,243,519; 4,801,373 and 5,292,428.

SUMMARY OF THE INVENTION

The invention relates to a three stage process for hydroprocessing a hydrocarbonaceous feed in which the feed is reacted with fresh hydrogen in the presence of a hydroprocessing catalyst in two separate, liquid reaction stages, both of which produce a vapor and liquid effluent which are separated after each liquid stage. The partially hydroprocessed first stage liquid effluent is the feed to the second stage and the second stage liquid effluent is the hydroprocessed product liquid. The first stage effluent vapors are hydroprocessed by reacting with hydrogen in a vapor reaction stage to produce hydroprocessed vapors. Fresh hydrogen or a hydrogen containing treat gas is used in each liquid stage. The hydrocarbonaceous feed to be hydroprocessed is introduced into the first liquid stage in which it is partially hydroprocessed and then passed into the second liquid stage to complete the hydroprocessing and form a hydroprocessed product liquid. The hydrogen for the vapor stage reaction is preferably unreacted hydrogen present in the first stage vapor effluent. However, if desired all or a portion of the vapor stage reaction hydrogen may come from fresh hydrogen or a hydrogen-containing treat gas introduced into the vapor stage reaction zone. In the preferred embodiment, sufficient fresh hydrogen or a hydrogen-containing treat gas must be introduced into the first stage to insure sufficient unreacted hydrogen in the first stage vapor effluent. All or a portion of the vapor stage effluent is cooled to condense and recover hydroprocessed carbonaceous material as additional product liquid which may be blended with the second liquid stage product liquid effluent. When the feed comprises hydrocarbons, the cooled and condensed vapor stage effluent will typically comprise material having at least three and preferably at least four carbon atoms. The term "hydrogen" as used herein refers to hydrogen gas. In its broadest sense, the invention comprises a hydroprocessing process which includes two liquid and one vapor reaction stages and which comprises the steps of:

(a) reacting a hydrocarbonaceous feed with fresh hydrogen in a first hydroprocessing liquid reaction stage in the presence of a hydroprocessing catalyst to form a first stage effluent comprising a partially hydroprocessed hydrocarbonaceous liquid and vapor;

(b) separating said first stage liquid and vapor effluent;

(c) reacting said first stage liquid effluent with fresh hydrogen in the presence of a hydroprocessing catalyst in a second hydroprocessing liquid reaction stage to produce a second stage effluent comprising a hydroprocessed hydrocarbonaceous product liquid and vapor;

(d) separating said second stage liquid and vapor effluent, and (e) reacting said first stage vapor effluent with hydrogen in the presence of a hydroprocessing catalyst in said vapor reaction stage to form a hydroprocessed hydrocarbonaceous vapor.

Typically at least a portion of the hydroprocessed vapor will be cooled to condense out the vaporized hydroprocessed material as additional product liquid, which is separated from the remaining uncondensed vapor.

In one embodiment, the first liquid stage and the vapor stage may both be in the same vessel. In another embodiment, all three reaction stages may each be in a separate reaction vessel. The catalyst used in each stage may be the same or different, depending on the feed and the process objectives. Further embodiments include stripping the recovered, hydroprocessed product liquid to remove undesirable reaction products.

In the practice of the invention, the fresh hydrocarbonaceous feed fed into the first stage reaction zone is mostly liquid and typically completely liquid. During the hydroprocessing, at least a portion of the lighter or lower boiling feed components are vaporized in each liquid stage. The amount of feed vaporization will depend on the nature of the feed and the temperature and pressure in the reaction stages and may range between about 5–80 wt. %. Thus, by liquid reaction stage is meant that some of the feed being hydroprocessed is in the liquid stage. In most cases the hydrocarbonaceous feed will comprise hydrocarbons. In an embodiment in which the process is a hydrotreating process for a sulfur and nitrogen containing distillate or diesel fuel fraction, the hydroprocessing forms H$_2$S and NH$_3$, some of which is dissolved in the hydroprocessed product liquid and vapor condensate. Simple stripping removes these species from these liquids.

DETAILED DESCRIPTION

Figure 1:
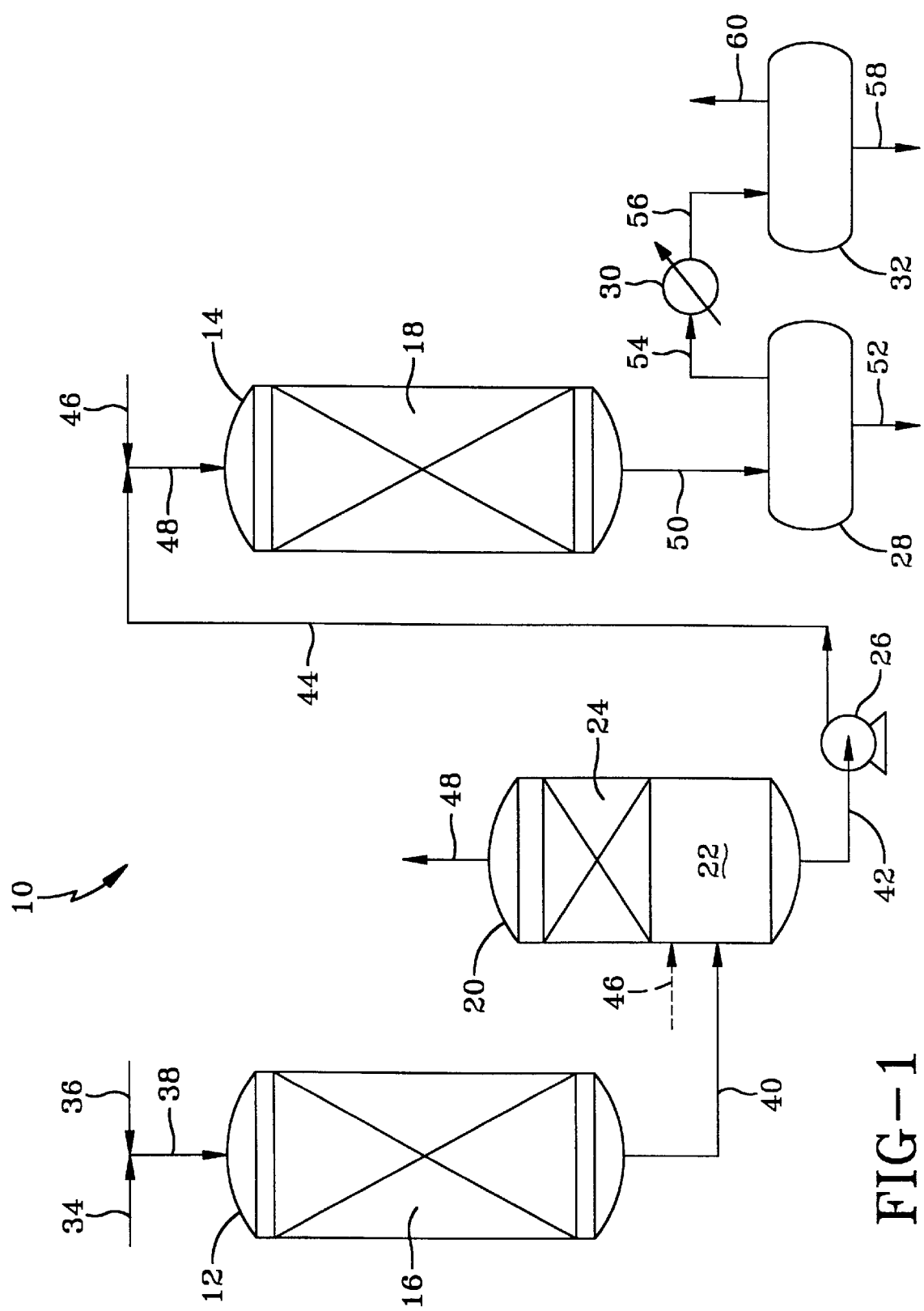
FIG. 1 schematically illustrates a flow diagram of an embodiment of the invention in which each hydroprocessing stage is in a separate vessel.

By hydroprocessing is meant a process in which hydrogen reacts with a hydrocarbonaceous feed to remove one or more heteroatom impurities such as sulfur, nitrogen, and oxygen, to change or convert the molecular structure of at least a portion of the feed, or both. Non-limiting examples of hydroprocessing processes which can be practiced by the present invention include forming lower boiling fractions from light and heavy feeds by hydrocracking; hydrogenating aromatics and other unsaturates; hydroisomerization and/or catalytic dewaxing of waxes and waxy feeds, and demetallation of heavy streams. Ring-opening, particularly of naphthenic rings, can also be considered a hydroprocessing process. By hydrocarbonaceous feed is meant a primarily hydrocarbon material obtained or derived from crude petroleum oil, from tar sands, from coal liquefaction, shale oil and hydrocarbon synthesis. The reaction stages used in the practice of the present invention are operated at suitable temperatures and pressures for the desired reaction. For example, typical hydroprocessing temperatures will range from about 40° C. to about 450° C. at pressures from about 50 psig to about 3,000 psig, preferably 50 to 2,500 psig.

Feeds suitable for use in such systems include those ranging from the naphtha boiling range to heavy feeds, such as gas oils and resids. Non-limiting examples of such feeds which can be used in the practice of the present invention include vacuum resid, atmospheric resid, vacuum gas oil (VGO), atmospheric gas oil (AGO), heavy atmospheric gas oil (HAGO), steam cracked gas oil (SCGO), deasphalted oil (DAO), light cat cycle oil (CCO), natural and synthetic feeds derived from tar sands, shale oil, coal liquefaction and hydrocarbons synthesized from a mixture of H$_2$ and CO via a Fischer-Tropsch type of hydrocarbon synthesis.

For purposes of hydroprocessing and in the context of the invention, the terms "fresh hydrogen" and "hydrogen-containing treat gas" are synonymous and may be either pure hydrogen or a hydrogen-containing treat gas which is a treat gas stream containing hydrogen in an amount at least sufficient for the intended reaction plus other gas or gasses (e.g., nitrogen and light hydrocarbons such as methane) which will not adversely interfere with or affect either the reactions or the products. These terms exclude recycled vapor effluent from another stage which has not been processed to remove contaminants and at least a portion of any hydrocarbonaceous vapors present. They are meant to include either hydrogen or a hydrogen-containing gas from any convenient source, including the hydrogen-containing gas comprising unreacted hydrogen recovered from hydroprocessed vapor effluent, after first removing at least a portion and preferably most of the hydrocarbons (e.g., $C_{4+}$–$C_{5+}$) or hydrocarbonaceous material and any contaminants (e.g., H$_2$S and NH$_3$) from the vapor, to produce a clean, hydrogen rich treat gas. The treat gas stream introduced into a reaction stage will preferably contain at least about 50 vol. %, more preferably at least about 75 vol. % hydrogen. In operations in which unreacted hydrogen in the vapor effluent of any particular stage is used for hydroprocessing in a subsequent stage or stages, there must be sufficient hydrogen present in the fresh treat gas introduced into that stage for the vapor effluent of that stage to contain sufficient hydrogen for the subsequent stage or stages.

The invention can be further understood with reference to FIG. 1 which is a schematic drawing of a hydroprocessing unit useful in the practice of the invention. In this particular embodiment the hydroprocessing process is a hydrotreating process and the reaction stages hydrotreating stages. For the sake of simplicity, not all process reaction vessel internals, valves, pumps, heat transfer devices etc. are shown. Thus, a hydrotreating unit 10 comprises first and second liquid stage reaction vessels 12 and 14 containing respective fixed catalyst beds 16 and 18 within, for hydrotreating a distillate or diesel feed. A third vessel 20 is a dual function vessel containing a gas-liquid separation zone 22 at the bottom and a vapor stage catalyst bed 24 in its upper portion for removing sulfur and nitrogen from the hydrocarbon vapors present in the vapor effluent from the first stage as H$_2$S and NH$_3$. Also shown are a liquid transfer pump 26, simple drum separators 28 and 32, and a heat exchanger 30. The heteroatom-containing hydrocarbon feed to be hydrotreated enters the first stage reaction vessel 12 via lines 34 and 39. In this particular illustration of the invention, the feed is a petroleum derived distillate or diesel fuel fraction containing heteroatom compounds of sulfur, nitrogen and perhaps oxygen. Fresh, once-through hydrogen or a treat gas comprising hydrogen enters via lines 36 and 38. The feed and hydrogen pass into vessel 12 and cocurrently down through the catalyst bed 16 which contains a sulfur tolerant catalyst, in which the feed reacts with the hydrogen in the presence of the catalyst to remove oxygenates and sulfur and nitrogen compounds as H$_2$S and NH$_3$, and also saturate olefins and aromatics, to form a first stage effluent comprising a mixture of partially hydroprocessed liquid and a vapor which contains vaporized feed components, H$_2$S and NH$_3$. In one embodiment, this first stage vapor effluent also contains sufficient unreacted hydrogen to hydrotreat the heteroatom-containing hydrocarbon vapor components in the subsequent vapor hydrotreating stage below. This is a preferred embodiment. In another embodiment the first stage vapor effluent will either contain essentially no unreacted hydrogen or unreacted hydrogen in an amount insufficient to hydrotreat the hydrocarbon component of the vapor effluent. In this latter case, fresh hydrogen or a hydrogen-containing treat gas must also be introduced via line 47 into the vapor hydrotreating stage in an amount sufficient to insure that the hydrocarbon component is hydrotreated in the vapor stage. Most (e.g., $\geq 50\%$) of the feed hydrotreating is accomplished in the first stage. In two stage hydrotreating processes, it is not unusual for 60%, 75% and even $\geq 90\%$ of the heteroatoms (S, N and O) to be removed from the liquid in the first stage. Therefore, the second stage catalyst can be a more active, but less sulfur tolerant catalyst than the first stage catalyst for heteroatom removal and in addition can also achieve aromatics saturation. In this embodiment the second stage catalyst comprises nickel-molybdenum or nickel-tungsten catalytic metal components on an alumina support. The first stage liquid and vapor effluents are removed from the bottom of the vessel and passed via line 40 into gas-liquid separation zone 22 in the bottom of the vapor phase reaction vessel 20. The partially hydroprocessed liquid separates from the vapor effluent and is removed from the bottom of the vessel via line 42 and passed, via liquid transfer pump 26, lines 44 and 48 into the second liquid hydroprocessing stage reaction vessel 14. In this embodiment, the second liquid stage is operated at a higher pressure than the first stage. Therefore a pump is required to pump the first stage liquid effluent into and through the second stage. Alternately, the second liquid stage can be operated at a lower pressure than the first liquid stage, in which a pump may not be required to transfer first stage liquid to the second stage. The vapor stage reaction zone 24 operates at a lower pressure than the first liquid stage reaction zone 16. The vapor phase passes up into hydrotreating catalyst bed 24 in which most of the remaining sulfur and nitrogen compounds are removed from the vaporized feed components by reacting with hydrogen to form $H_2S$ and $NH_3$ which, along with the hydrotreated hydrocarbons and other vapor components, are removed from the top of the vessel via line 41. This hydrotreated gas is then passed via line 41 to a heat exchanger and knock-out or separation drum (not shown) as in the embodiment shown in FIG. 2 to condense the $C_{4+}$–$C_{5+}$ hydrocarbons as additional product liquid which may be blended with the hydrotreated product liquid recovered via line 52.

The partially hydroprocessed liquid passed into the top of vessel 14 meets with incoming fresh hydrogen or a treat gas comprising hydrogen which enters via lines 46 and 48, with the hydrogen and liquid passing cocurrently down through the second liquid hydrotreating reaction stage catalyst bed 18, in which the liquid reacts with the hydrogen in the presence of the catalyst to hydrotreat the liquid to remove more heteroatoms and form a second stage effluent comprising a hydrotreated product liquid and a vapor. As with the first stage vapor effluent, the second stage vapor effluent also contains a vaporized hydrocarbon component. Since most of the heteroatoms are removed in the first stage and the vaporized second stage hydrocarbons are also at least partially hydrotreated, the heteroatom content of the second stage hydrocarbon vapor is very low. A mixture of the second stage liquid and vapor effluent is removed from the bottom of vessel 14 via line 50 and passed into drum separator 28. Alternately, the bottom of the vessel 14 could serve as a means for separating the second stage liquid and vapor effluents. In 28 the vapor separates from the product liquid, with the product liquid removed via line 52 and sent to stripping (not shown), either with or without having first been blended with the hydrotreated liquid recovered from the hydroprocessed vapors from the vapor stage reaction vessel 20, to remove any dissolved $H_2S$ and $NH_3$. The hydroprocessed second stage vapor effluent is removed from vessel 28 via line 54 and passed through heat exchanger 30 to cool it and condense out $C_{4+}$–$C_{5+}$ hydrocarbons, with the mixture of liquid and remaining vapors passed into drum separator 32 via line 56. The condensed liquids are removed via line 58. The remaining vapors comprise uncondensed hydrocarbons (e.g., $C_{4-}$–$C_{5-}$ and mostly methane), along with some $H_2S$ and $NH_3$. If the vapor withdrawn via line 60 contains sufficient unreacted hydrogen, it may be scrubbed with an aqueous amine solution to remove the $H_2S$ and $NH_3$ to form a clean, hydrogen-rich gas, which may then be used as part of the treat gas to the first liquid stage or, alternately, as treat gas to the second liquid stage after compression.

Figure 2:
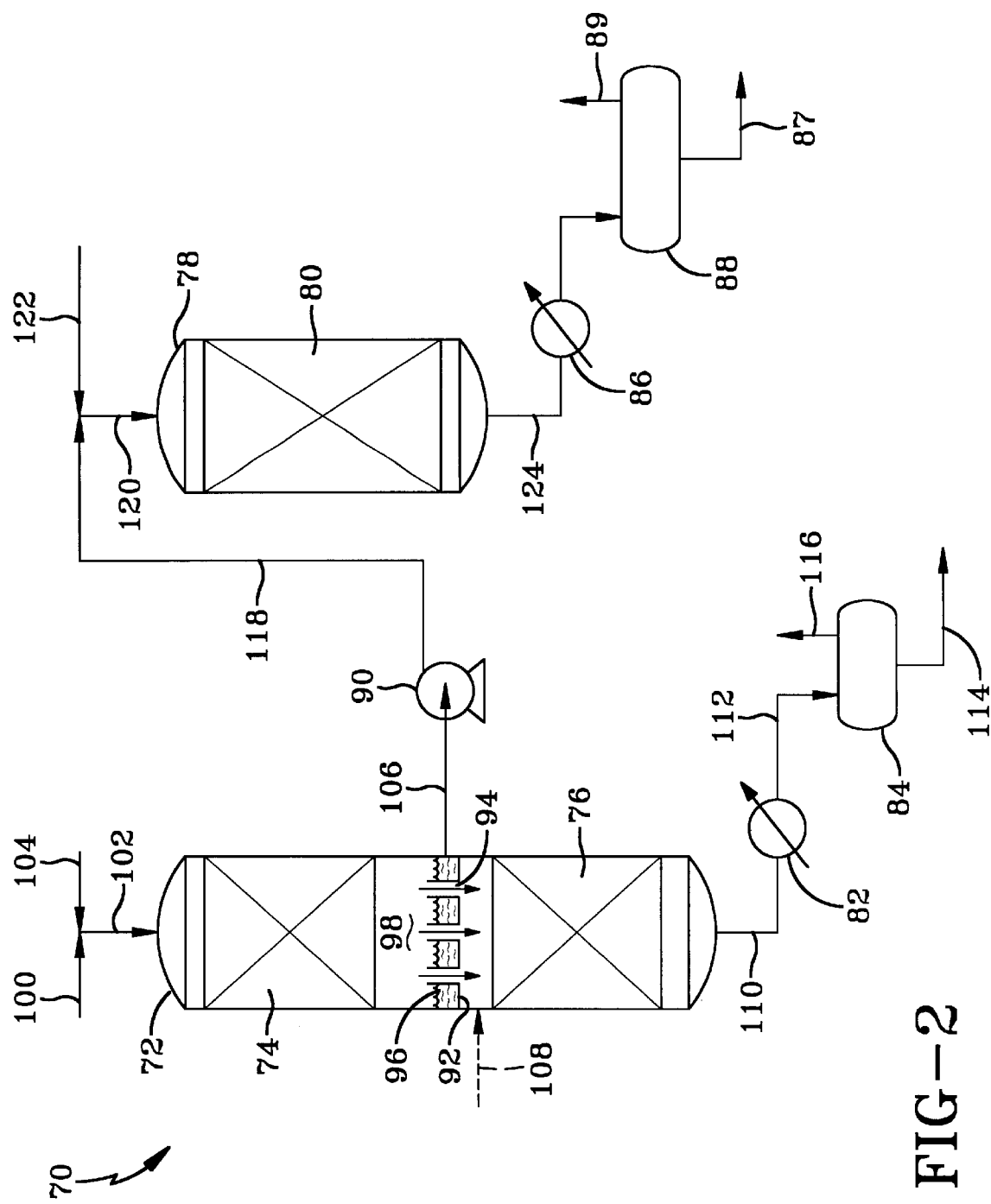
FIG. 2 is a simple schematic flow diagram of an embodiment of the invention in which the first liquid reaction stage and the vapor reaction stage are both located in the same vessel.

FIG. 2 schematically illustrates another embodiment of the process of the invention, in which the first liquid stage and the vapor stage are located in the same vessel. As is the case for the embodiment shown in FIG. 1, this embodiment will also be explained with particular reference to hydrotreating a heteroatom-containing fuel distillate fraction. Referring to FIG. 2, in the hydrotreating unit 70, the feed liquid is passed via lines 100 and 102 into the top of vessel 72 above the first liquid stage. At the same time, fresh hydrogen or hydrogen-containing treat gas is passed into the vessel via lines 104 and 102. The feed and hydrogen pass cocurrently down through the catalyst bed 74 in which heteroatoms are removed and some components are saturated as in FIG. 1, to produce a first stage effluent comprising partially hydrotreated liquid and a vapor which comprises vaporized feed components, unreacted hydrogen, $H_2S$ and $NH_3$. The liquid and vapor effluents pass down into liquid and vapor separating space 98 in which they separate, with the liquid passing down onto the tray 92 on which it accumulates as a layer 96, and is continuously withdrawn via line 106. Tray 92 is a solid, gas and liquid impervious horizontal tray (as is well known) having a plurality of vapor conduits or chimneys extending vertically through, of which only one, 94, is labeled for convenience. The first stage vapor effluent passes down through the chimneys as indicated by the arrows and passes on down through the vapor stage catalyst bed 76 below. While it is preferred that this vapor contain sufficient unreacted hydrogen from 104 to hydrotreat the heteroatom-containing hydrocarbon component of the vapor, in some cases it may be necessary or desirable to introduce fresh hydrogen or a hydrogen-containing treat gas to provide all or a portion of the hydrogen required. This is introduced into the vapor stage via line 108 shown as a dotted line. The hydrocarbon component of the vapor is hydrotreated by reacting with the hydrogen to form additional $H_2S$ and $NH_3$, and the resulting hydrotreated vapor effluent removed from the bottom of the vessel via line 110. This vapor is cooled by being passed through a heat exchanger 82 to condense the $C_{4+}$–$C_{5+}$ hydrotreated hydrocarbons from the uncondensed, heteroatom-containing vapor. The resulting mixture of hydrocarbon liquid and the remaining vapor is passed into a simple drum separator 84 via line 112 to separate and recover the liquid which is withdrawn via line 114 as additional product liquid, and the remaining vapor removed via line 116 and sent to further processing for sulfur and nitrogen removal before being burned as fuel. Alternately, if sufficient unreacted hydrogen is present in the remaining vapor, the vapor may be scrubbed with an aqueous amine solution to remove the $H_2S$ and $NH_3$ to form a clean, hydrogen-rich gas which may be sent to a compressor and used as fresh treat gas. The first stage liquid effluent is passed to transfer pump 90 which passes the liquid into the top of second stage hydrotreating vessel 78 via lines 118 and 120. At the same time, fresh hydrogen or a hydrogen-containing treat gas is passed into the vessel via lines 122 and 120. The hydrogen and liquid flow cocurrently down through the catalyst bed 80 in which the partially hydroprocessed liquid reacts with the hydrogen to remove more heteroatom compounds, etc. and form a second stage effluent comprising a hydrotreated product liquid and a hydroprocessed vapor effluent containing vaporized hydrocarbons which contain very low levels of heteroatom compounds, $H_2S$ and $NH_3$. The hydrotreated product liquid and vapor effluents are removed from the bottom of 78 via line 124 and passed through heat exchanger 86 which cools the mixture and condenses a majority of the hydrocarbons, and the liquid and uncondensed vapor passed into a drum separator 88 to separate and remove most of the $C_{4+}$–$C_{5+}$ hydrocarbons as liquid via line 87. The uncondensed vapors are removed via line 89.

Those skilled in the art will appreciate that the invention can be extended to more than two liquid and one vapor stages. Thus, one may also employ three or more liquid stages in which the partially processed liquid effluent from the first stage is the second stage feed, the second stage liquid effluent is the third stage feed, and so on, with attendant vapor stage processing in one or more vapor reaction stages. By reaction stage is meant at least one catalytic reaction zone in which the liquid, vapor or mixture thereof reacts with hydrogen in the presence of a suitable hydroprocessing catalyst to produce an at least partially hydroprocessed effluent. The catalyst in a reaction zone can be in the form of a fixed bed, a fluidized bed or dispersed in a slurry liquid. More than one catalyst can also be employed in a particular zone as a mixture or in the form of layers (for a fixed bed). Further, where fixed beds are employed, more than one bed of the same or different catalyst may be used, so that there will be more than one reaction zone. The beds may be spaced apart with optional gas and liquid distribution means upstream of each bed, or one bed of two or more separate catalysts may be used in which each catalyst is in the form of a layer, with little or no spacing between the layers. The hydrogen and liquid will pass successively from zone to the next. The hydrocarbonaceous material and hydrogen or treat gas are introduced at the same or opposite ends of the stage and the liquid and/or vapor effluent removed from a respective end.

The term "hydrotreating" as used herein refers to processes wherein a hydrogen-containing treat gas is used in the presence of a suitable catalyst which is primarily active for the removal of heteroatoms, such as sulfur, and nitrogen, nonaromatics saturation and, optionally, saturation of aromatics. Suitable hydrotreating catalysts for use in a hydrotreating embodiment of the invention include any conventional hydrotreating catalyst. Examples include catalysts comprising of at least one Group VIII metal catalytic component, preferably Fe, Co and Ni, more preferably Co and/or Ni, and most preferably Co; and at least one Group VI metal catalytic component, preferably Mo and W, more preferably Mo, on a high surface area support material, such as alumina. Other suitable hydrotreating catalysts include zeolitic catalysts, as well as noble metal catalysts where the noble metal is selected from Pd and Pt. As mentioned above, it is within the scope of the present invention that more than one type of hydrotreating catalyst may be used in the same reaction stage or zone. Typical hydrotreating temperatures range from about 100° C. to about 400° C. with pressures from about 50 psig to about 3,000 psig, preferably from about 50 psig to about 2,500 psig. If one of the reaction stages is a hydrocracking stage, the catalyst can be any suitable conventional hydrocracking catalyst run at typical hydrocracking conditions. Typical hydrocracking catalysts are described in U.S. Pat. No. 4,921,595 to UOP, which is incorporated herein by reference. Such catalysts are typically comprised of a Group VIII metal hydrogenating component on a zeolite cracking base. Hydrocracking conditions include temperatures from about 200° to 425° C.; a pressure of about 200 psig to about 3,000 psig; and liquid hourly space velocity from about 0.5 to 10 V/V/Hr, preferably from about 1 to 5 V/V/Hr. Non-limiting examples of aromatic hydrogenation catalysts include nickel, cobalt-molybdenum, nickel-molybdenumn, and nickel-tungsten. Noble metal (e.g., platinum and/or palladium) containing catalysts can also be used. The aromatic saturation zone is preferably operated at a temperature from about 40° C. to about 400° C., more preferably from about 260° C. to about 350° C., at a pressure from about 100 psig to about 3,000 psig, preferably from about 200 psig to about 1,200 psig, and at a liquid hourly space velocity (LHSV) of from about 0.3 V/V/Hr. to about 2 V/V/Hr.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A hydroprocessing process which includes two liquid and one vapor reaction stages and which comprises the steps of:
   (a) reacting a hydrocarbonaceous feed with fresh hydrogen in a first hydroprocessing liquid reaction stage in the presence of a first hydroprocessing catalyst to form a first stage effluent comprising a partially hydroprocessed hydrocarbonaceous liquid and vapor
   (b) separating said first stage liquid and vapor effluent;
   (c) reacting said first stage liquid effluent with fresh hydrogen in the presence of a second hydroprocessing catalyst in a second hydroprocessing liquid reaction stage to produce a second stage effluent comprising a hydroprocessed hydrocarbonaceous product liquid and a vapor phase comprising hydroprocessed hydrocarbonaceous vapor;
   (d) cooling said second stage hydroprocessed hydrocarbonaceous vapor effluent to condense at least a portion of it to produce hydroprocessed hydrocarbonaceous product liquid, and uncondensed vapor, wherein said uncondensed vapor is separated from said product liquid and
   (e) reacting, said first stage vapor effluent with hydrogen in the presence of the second hydroprocessing catalyst in said vapor reaction stage to form a vapor stage hydroprocessed hydrocarbonaceous vapor, the second hydroprocessing catalyst having a higher hydroprocessing activity and a lower sulfur tolerance than the first hydroprocessing catalyst.

2. A process according to claim 1 wherein at least a portion of said vapor stage hydroprocessed hydrocarbonaceous vapor is condensed to liquid.

3. A process according to claim 2 wherein at least a portion of said condensed hydrocarbonaceous vapor is blended with said hydroprocessed product liquid.

4. A process according to claim 1 wherein at least a portion of said vapor stage reaction hydrogen comprises fresh hydrogen.

5. A process according to claim 4 wherein all of said vapor stage reaction hydrogen comprises fresh hydrogen.

6. A process according to claim 1 wherein all three reaction stages are in separate vessels.

7. A process according to claim 1 wherein said first liquid stage and said vapor stage are in the same vessel.

8. A process according to claim 1 wherein said hydrocarbonaceous feed comprises a hydrocarbon liquid.

9. A process according to claim 1 wherein said fresh hydrogen in said first hydroprocessing liquid stage is added to said first stage in an amount sufficient to provide enough unreacted hydrogen in said first stage vapor effluent to hydroprocess said first stage vapor effluent in said vapor reaction stage.

10. A process for hydrotreating a feed comprising a hydrocarbon liquid which contains heteroatom compounds and unsaturates which comprises the steps of:

(a) reacting said feed with fresh hydrogen in a first hydrotreating liquid reaction stage, in the presence of a first hydrotreating catalyst to remove most of said heteroatoms from said feed to form a first stage effluent comprising a partially hydrotreated liquid and vapor;

(b) separating said first stage liquid and vapor effluent;

(c) reacting said first stage liquid effluent with fresh hydrogen in the presence of a second hydrotreating catalyst in a second hydrotreating liquid reaction stage to remove additional heteroatom compounds and unsaturates and produce a second stage effluent comprising a hydrotreated hydrocarbon product liquid and a vapor phase comprising hydrotreated hydrocarbon vapor:

(d) cooling said second stage hydrotreated hydrocarbon vapor effluent to condense at least a portion of it to produce hydrotreated hydrocarbon product liquid and uncondensed vapor, wherein said uncondensed vapor is separated from said product liquid which is recovered, and (e) reacting said first stage vapor effluent with hydrogen in the presence of a second hydrotreating catalyst in a vapor reaction stage to form a vapor stage hydrotreated hydrocarbon vapor, the second hydrotreating catalyst having a greater hydrotreating activity and a lower surfur tolerance than the first hydrotreating catalyst.

11. A process according to claim 10 wherein said vapor reaction stage hydrotreated vapor effluent is cooled to condense a portion of the hydrotreated hydrocarbons present therein as liquid condensate which is separated from the remaining uncondensed vapor.

12. A process according to claim 11 wherein said hydrotreated second liquid reaction stage vapor effluent is cooled to condense a portion of the hydrotreated hydrocarbons present therein as liquid which is separated from the remaining uncondensed vapor.

13. A process according to claim 10 wherein at least a portion of said vapor stage reaction hydrogen comprises fresh hydrogen.

14. A process according to claim 13 wherein all of said vapor stage reaction hydrogen comprises fresh hydrogen.

15. A process according to claim 10 wherein all three reaction stages are in separate vessels.

16. A process according to claim 10 wherein said first liquid stage and said vapor stage are in the same vessel.

17. A process according to claim 10 wherein said fresh hydrogen in said first hydrotreating liquid reaction stage is added to said first stage in an amount sufficient to provide enough unreacted hydrogen in said first stage vapor effluent to hydrotreat said first stage vapor effluent in said vapor reaction stage.

* * * * *